(12) United States Patent
Prystupa et al.

(10) Patent No.: US 12,480,862 B2
(45) Date of Patent: Nov. 25, 2025

(54) MAGNETIC PLATFORM FOR SAMPLE ORIENTATION

(71) Applicant: 11886827 Canada Ltd., Winnipeg (CA)

(72) Inventors: David Allan Prystupa, Pinawa (CA); John Stephen Pacak, Winnipeg (CA); Peter Condie Nell, Winnipeg (CA)

(73) Assignee: 11886827 Canada Ltd., CentrePort (CA)

( * ) Notice: Subject to any disclaimer, the term of this patent is extended or adjusted under 35 U.S.C. 154(b) by 1225 days.

(21) Appl. No.: 17/178,561

(22) Filed: Feb. 18, 2021

(65) Prior Publication Data

US 2021/0255091 A1    Aug. 19, 2021

Related U.S. Application Data

(60) Provisional application No. 62/978,675, filed on Feb. 19, 2020.

(51) Int. Cl.
| | |
|---|---|
| *G01N 21/01* | (2006.01) |
| *G01N 21/21* | (2006.01) |
| *G01N 21/25* | (2006.01) |
| *G01N 23/20025* | (2018.01) |
| *G01N 23/2204* | (2018.01) |

(52) U.S. Cl.
CPC ............ *G01N 21/01* (2013.01); *G01N 21/21* (2013.01); *G01N 21/25* (2013.01); *G01N 23/20025* (2013.01); *G01N 23/2204* (2013.01)

(58) Field of Classification Search
CPC ......... B33Y 10/00; C23C 24/00; C23C 30/00; C23C 4/00; C23C 4/04; C23C 4/06; C23C 4/12; G01N 21/01; G01N 23/20025; G01N 23/2204
See application file for complete search history.

(56) References Cited

U.S. PATENT DOCUMENTS 11,884,019 B2 *   1/2024   Wilds ..................... B33Y 50/02

* cited by examiner

*Primary Examiner* — Michael P Wieczorek
(74) *Attorney, Agent, or Firm* — Adrian David Battison; Ade & Company Inc.; Ryan W. Dupuis

(57) ABSTRACT

A method is provided for positioning and orienting a platform such as a sample or workpiece relative to a frame of reference where the platform is a complex magnetic object that contains at least two magnetic domains with non-collinear magnetic moments and the method includes generating a spatially and temporally varying magnetic field so that each magnetic moment of the complex magnetic object interacts with the applied magnetic field. This can be used to performs an operation on a workpiece such as addition or removal of material. This can be used where the object includes a sample and, in each measurement configuration of the sample, radiation transmitted, reflected or scattered is measured from said sample material and analyzed to obtain information about the sample material.

39 Claims, 7 Drawing Sheets

MAGNETIC PLATFORM FOR SAMPLE ORIENTATION

This application claims the benefit under 35 USC 119 (e) of Provisional Application 62/978,675 filed on Feb. 19, 2020 and related to MAGNETIC PLATFORM FOR SAMPLE ORIENTATION, the disclosure of which is incorporated herein by reference This application is related to the subject matter of Provisional Application 62/978,671 filed on Feb. 19, 2020 and related to FIELD PROGRAMMABLE ANALOG ARRAY, together with a non-provisional application, filed on a common date with the present application, claiming priority therefrom, the disclosure of both of which documents is incorporated herein by reference.

This application is related to the subject matter of Provisional Application 62/978,680 filed on Feb. 19, 2020 and related to FIELD PROGRAMMABLE FLUIDIC ARRAY, together with a non-provisional application, filed on a common date with the present application, claiming priority therefrom, the disclosure of both of which documents is incorporated herein by reference.

This application is related to Performing operations on a workpiece using Electromagnetic Forces as described in PCT Application PCT/CA2021/050118 which corresponds to U.S. application Ser. No. 17/166,207 filed Feb. 3, 2021, the disclosures of which are incorporated herein by reference.

The invention relates to a system for positioning and orienting a platform relative to a frame of reference.

BACKGROUND OF THE INVENTION

This application is related to Method and Apparatus for Singulating Particles in a Stream as described in PCT Application PCT/CA2017/050907 published on 1 Feb. 2018 as WO 2018/018155 which corresponds to U.S. application Ser. No. 15/662,794, the disclosures of which are incorporated herein by reference.

This application is related to High efficiency multiplexing as described in PCT Application PCT/CA2018/050599 published on 29 Nov. 2018 as WO 2018/213923 which corresponds to U.S. application Ser. No. 15/987,279, now U.S. Pat. No. 10,585,044 issued Mar. 10, 2020 the disclosures of which are incorporated herein by reference.

This application is related to High resolution multiplexing system as described in PCT Application PCT/CA2019/051625 published on 22 May 2020 as WO 2020/097732 which corresponds to U.S. application Ser. No. 16/683,357, the disclosures of which are incorporated herein by reference.

This application is related to Spatial Modulation Device as described in PCT Application PCT/CA2019/051626 published on 22 May 2020 as WO 2020/097733 which corresponds to U.S. application Ser. No. 16/683,376 filed Nov. 14, 2019, the disclosures of which are incorporated herein by reference.

SUMMARY OF THE INVENTION

According to the invention there is provided a method for positioning and orienting a platform relative to a frame of reference;
wherein the platform is a complex magnetic object that contains at least two magnetic domains with non-collinear magnetic moments;
and generating a spatially and temporally varying magnetic field so that each magnetic moment of the complex magnetic object interacts with the applied magnetic field.

The frame of reference may be defined by the direction of a flux of incident particles. The frame of reference may be defined by a workpiece. The platform is a complex magnetic object defined as an object that contains at least two magnetic domains with non-collinear magnetic moments. The complex magnetic object, henceforth abbreviated "CMO" is placed in a spatially and temporally varying magnetic field and each magnetic moment of the CMO interacts with the applied magnetic field. The CMO experiences net forces and torques that depend on the direction and magnitude of the magnetic moments relative to the applied magnetic field and its gradient. The CMO has at least three whole body translational degrees of freedom and at least three whole body rotational degrees of freedom. The CMO may have additional degrees of freedom related to deformation of the CMO as a whole. Due to the high number of degrees of freedom, the CMO is functionally similar to a goniometer and is hence termed "magnetic goniometer" in this document. The magnetic goniometer of the present invention has more freedom of motion than a prior art mechanical goniometer and hence is an advance in the art.

A sample material may be attached to the magnetic goniometer at a location and a plurality of operations may be performed on the sample material. The magnetic goniometer has utility in cases wherein a plurality of operations is performed on the sample material in a plurality of orientations relative to some reference. The reference is conveniently taken as the direction of flux of particles and a direction perpendicular to the flux of particles. For example the flux of particles may be photons wherein the Poynting vector gives the direction and the perpendicular direction is a polarization vector.

The magnetic goniometer may include an integral tool that performs an operation on a workpiece. In this case, the magnetic goniometer is positioned and oriented relative to the coordinates of the workpiece. Since the integral tool of the magnetic goniometer is unconstrained by physical attachment, more positions and orientations are accessible than is the case for a conventional tool constrained by physical attachment.

In an important application of the magnetic goniometer, a sample molecule is attached to a magnetic goniometer, the magnetic goniometer (and attached molecule) is oriented through a sequence of orientations relative to incident electromagnetic radiation, and molecular spectra are measured for each orientation. Further for each orientation, the environment of the sample molecule may be varied and spectra for each environment measured to give a plurality of spectra. The molecular environment may be varied by changing a feature of the platform surface and by applying an external electromagnetic field. The plurality of spectra obtained by varying orientation and environment is analyzed to provide information about the molecule. This application is particularly useful for distinguishing between molecules for which the spectra of un-oriented samples are similar or undistinguishable.

In an important application of the magnetic goniometer, a first set of material is added to the magnetic goniometer in a first orientation and a second set of material is added to the magnetic goniometer in a second orientation. Three dimensional objects may be generated wherein material is added from any direction.

In an important application of the magnetic goniometer, the magnetic goniometer is moved from a first orientation to a second orientation wherein a flux of particles travels in a first direction when the magnetic goniometer is in the first orientation and a flux of particles travels in a second direction when the magnetic goniometer is in the second orientation. The magnetic goniometer may for example have a reflective surface that reflects a flux of photons in different directions for different orientations. The magnetic goniometer may for example direct the flow of a fluid in different directions for different orientations.

In an important application of the magnetic goniometer, the magnetic goniometer is positioned and oriented relative to a location on a workpiece and an operation performed by the magnetic goniometer causes material to be added to the workpiece at the location. The magnetic goniometer may for example emit or reflect radiation incident at the location causing the addition of material via photo-polymerization.

In an important application of the magnetic goniometer, the magnetic goniometer is positioned and oriented relative to a location on a workpiece and an operation performed by the magnetic goniometer causes material at the location to be modified. For example, the magnetic goniometer may include an integral die that performs a stamping operation when brought in contact with the workpiece location.

In an important application of the magnetic goniometer, the magnetic goniometer is positioned and oriented relative to a location on a workpiece and a machining operation performed by the magnetic goniometer causes material to be removed from the workpiece at the location. For example, the magnetic goniometer may include an integral cutting tool that is brought into contact with the workplace location along a path and material is removed along said path.

In accordance with an important feature of the invention, there is provided a complex magnetic object (CMO) and a magnetic field generating means operable to generate a temporally and spatially varying magnetic field impinging upon the CMO wherein the CMO has a plurality of non-collinear magnetic moments and wherein a change in the magnetic field interacting with said magnetic moments causes a change in the orientation and position of the CMO. Preferably the domains of the magnetic moments are spatially separated such that the magnetic field at the location of a first magnetic domain is different from the magnetic field at the location of a second magnetic domain.

In accordance with an important feature of the invention, the magnetic field generating means further includes a control means operable to calculate the magnetic field pattern required to translate and orient the CMO and to generate signals that cause the calculated magnetic fields to be generated.

The magnetic field generating means may be the arrangement described in the above defined US Application Field Programmable Analog Array 82/378.671. Other magnetic field generating means may be used.

In accordance with an important optional feature of the invention which can be used independently with any of the above or following features, the magnetic field generating means further includes magnetic flux directing means that operates to convey magnetic flux to a region proximate to and including the magnetic goniometer. The magnetic flux direction means may for example be one or more ferromagnetic arms with low magnetic reluctance arranged to compose a magnetic circuit including a gap region in which the magnetic goniometer is placed. The ferromagnetic arms may for example be iron needles.

In accordance with an important optional feature of the invention which can be used independently with any of the above or following features, the control means further includes a sensor means operable to measure the position and orientation of the CMO wherein the control means uses information from the sensor means at least in part to calculate the magnetic field pattern required to cause a change in the position or orientation of the CMO.

In accordance with an important feature of the invention, there is provided a means to direct at least one particle incident upon at least a portion of the CMO. In some embodiments the particle is a material that is added to the CMO in an additive operation. The added material may for example be monomer units of a polymer that are subsequently polymerized in a transformative operation. The added material may for example be a sample material for a subsequent measurement operation. In some embodiments the at least one particle is radiation comprised of a plurality of particles for a transformative operation or a measurement operation wherein the particles are photons, electrons, protons, ions, or neutrons.

In accordance with an important optional feature of the invention which can be used independently with any of the above or following features, there is provided a viscous material proximate to the CMO operable to generate a variable force or torque that resists a change in position or orientation of the CMO. The viscous material functions to damp vibrations of the CMO caused by changing magnetic fields. Changing magnetic fields linked with a position feedback loop are required to maintain a complex magnetic object within a tolerance displacement of a desired position. The tolerance displacement can be reduced by increasing the frequency of magnetic field adjustments. The viscous material may for example be water wherein the viscosity is varied by changing the temperature. The viscous material may for example be a liquid with a dissolved polymer material wherein the viscosity is changed by cycling between a low viscosity sol state and a high viscosity gel state.

In accordance with an important optional feature of the invention which can be used independently with any of the above or following features, the CMO is shaped and formed to retain a sample material at a location on the CMO. The CMO may for example include a cavity or a network of pores that contains and restricts the mobility of a sample material.

In accordance with an important optional feature of the invention which can be used independently with any of the above or following features, the CMO includes an attachment means to attach and retain a sample material. The attachment means may be chemical, physical or any combination of chemical and physical. For example the attachment means may include a covalent bond, a hydrogen bond, a dipole interaction, an ionic bond, an electrostatic interaction, or a Van der Waals bond. For example the attachment means may be an antibody bound to the surface of the CMO that retains a biological cell. For example the attachment means may be a polymer chain that becomes entangled with a sample material.

In accordance with an important optional feature of the invention which can be used independently with any of the above or following features, there is provided a means to generate a transient magnetic field proximate to the CMO. The transient magnetic field may for example be used to perturb the quantum states of a material on or integral to the CMO and of short enough duration that the impulsive force generated on the CMO does not change the position or orientation of the CMO by more than a user specified tolerance value.

In accordance with an important optional feature of the invention which can be used independently with any of the above or following features, there is provided a magnetic field sensor operable to measure the magnetic field proximate to the CMO.

In accordance with an important optional feature of the invention which can be used independently with any of the above or following features, there is provided an electric field device operable to generate an electric field impinging on the CMO. The electric field device may be for example an array of mesh or plates held at different electrical potentials located proximate to the CMO.

In accordance with an important optional feature of the invention which can be used independently with any of the above or following features, there is provided a physical property sensor operable to a physical property of the CMO or a location proximate to the CMO. A non-limiting list of physical property sensors includes a temperature sensor, a pressure sensor, a pH sensor, an ionic strength sensor, a conductivity sensor. Other types of sensors may be used.

In accordance with an important optional feature of the invention which can be used independently with any of the above or following features, there is provided a near field amplification device wherein the device comprises surface features shaped to amplify the electromagnetic field from incident electromagnetic radiation and wherein the position and orientation of the CMO are adjusted to bring a selected location of the CMO proximate to a selected location of the near field amplification device. The near field amplification device may for example be a device known to produce surface enhanced infrared absorption or surface enhanced Raman scattering. Maximal amplification of spectral signals typically occurs at particular locations on the near field enhancement device termed "hot spots". These devices may be fabricated by applying nano-particles comprised of noble metals Au, Ag, Pt or combinations thereof to a substrate surface. Alternately these devices may be fabricated with features of designed dimensions by lithographic processes wherein the designed dimensions are chosen to produce a particular plasmon resonance frequency that is close to frequency of an energy level in a target molecule.

In accordance with an important optional feature of the invention which can be used independently with any of the above or following features, the CMO includes an energy storage means. The energy storage means may for example be a battery or a capacitor or a container of chemical fuel.

In accordance with an important optional feature of the invention which can be used independently with any of the above or following features, the CMO includes an energy transformation means that transforms energy from a first form to a second form. For example, the CMO may include antennae that receive energy from radio waves and convert that energy into electrical energy. For example the CMO may include a photodiode that converts light energy into electrical energy. For example the CMO may include a fuel cell that converts chemical energy of a fuel into electrical energy. The fuel may be from a storage container or collected from the environment. For example the CMO may be placed in a liquid mixture or solution that is comprised in part of a chemical fuel. For example the fuel cell may be biological cell that converts an organic molecule into electrical energy.

In accordance with an important optional feature of the invention which can be used independently with any of the above or following features, the CMO includes an electronic device. The electronic device may for example be a sensor such as a photodiode array. The electronic device may for example be an integrated circuit that converts analog input from a sensor to digital output. The electronic device may be a communication device that information from a sensor device. The electronic device may for example be a light emitting device or a laser.

In accordance with an important optional feature of the invention which can be used independently with any of the above or following features, the CMO includes a means to generate an electric field between two points on said CMO. The CMO may for example consist of two conductive regions separated by a non-conductive region wherein the conductive regions are held at different voltages. The non-conductive region may for example contain a sample material such as a biological cell.

In accordance with an important optional feature of the invention which can be used independently with any of the above or following features, the CMO includes a non-linear optical material which when irradiated with photons of a first frequency and a second frequency emits photons of a third frequency. This feature can be used for example to generate photons of a third frequency in close proximity to a test material wherein the third frequency photons interact with the test material.

In accordance with an important optional feature of the invention which can be used independently with any of the above or following features, the CMO includes a means to transfer a label material to a proximate object. The label means may for example be a reservoir of isotopically labeled molecules that may be consumed or incorporated into a biological cell, tissue or macromolecule.

In an important embodiment that may be used in combination with any of the preceding or following embodiments, the magnetic field generating means is operated to translate a CMO to a selected location within a sample material. The magnetic field generating means may further operate to orient a CMO relative to a selected object. For example, an operator may select a particular cell within the sample material, translate a CMO to the cell location, and orient the CMO to perform an operation on the cell. The operation may for example be measuring a property of the cell. The sample material may be in vivo or in vitro.

In an important embodiment that may be used in combination with any of the preceding or following embodiments, the surface properties of a CMO are designed and fashioned to bind a first type of sample material in preference to a second type of sample material wherein the CMO is immersed in a solution containing a first type of sample material and a second type of sample material. The surface affinity for a sample material may for example depend upon the orientation of a crystallographic plane on a portion of the surface of a CMO. The mutual atomic geometry of atoms at the surface and atoms in a molecule proximate to the surface influences the distribution of charge in both and hence the forces between each part of the proximate molecule and the surface atoms. The spectra of molecules adsorbed to a surface are generally different from the spectra of the same type of molecule in isolation reflecting the change in electronic distribution. The surface of the CMO may include a substrate layer containing units that bind to specific types of sample molecules or cells. For example a block copolymer may be comprised of poly ethylene oxide (PEO) and an antibody wherein the PEO binds strongly to a silicon surface on a CMO there excluding the antibody from the surface region and the antibody binds to a specific cell type thereby tethering the cell to the surface via the PEO link.

In an embodiment that may be used in combination with any of the preceding or following embodiments, the CMO has a plurality of facets wherein each facet attracts a different type of sample material. For example, a CMO may be generally in the shape of a flake wherein a top surface is fashioned to attract and bind a first sample material type and a bottom surface is fashioned to attract and bind a second sample material type.

In an embodiment that may be used in combination with any of the preceding or following embodiments, the CMO has a plurality of distinct surfaces or facets wherein the material properties of each facet may be different. Each facet may have a different composition, texture, surface feature, or crystallographic orientation. Facets having different surface characteristics will interact with adsorbed analytes differently. For example, each facet may have a surface layer with a different crystallographic plane exposed causing adsorbed molecules to orient differently relative to the surface normal. It should be noted that the molecular energy levels and hence the spectra of adsorbed molecules will also be perturbed differently. In another example, each facet may have surface features that modify the local electric field giving rise to surface enhanced Raman scattering or surface enhanced infrared spectroscopy.

In an embodiment that may be used in combination with any of the preceding or following embodiments, each facet may have a different material added. For example, a different reagent may be added to each facet so that each facet is subsequently capable of performing a different test on a test sample.

In an important embodiment that may be used in combination with any of the preceding or following embodiments, a biological material such as a cell, tissue, antigen, a biological macromolecule or a biological reagent may be added to a CMO. The function of the added material may depend at least in part upon the structure of the underlying substrate.

In an important embodiment that may be used in combination with any of the preceding or following embodiments, the CMO includes a material that is absorbed or incorporated into a biological material. The absorbed or incorporated material may for example include isotope labels that are absorbed or metabolically incorporated into a cell. The absorbed or incorporated material may for example include a drug or therapeutic agent.

In an important embodiment that may be used in combination with any of the preceding or following embodiments, a sample material is added to a CMO in a first operation; at least one property of the sample material is measured in a second operation; and based at least in part on the at least one measured property, the sample material is either moved to a first location or to a second location. For example, the sample material may be a blood cell that is bound to a CMO in a first operation, measured in a second operation and moved to a first bin if the cell is normal, otherwise the cell is moved to a second bin. That is the method of the invention may be used for sorting cells.

In an important embodiment that may be used in combination with any of the preceding or following embodiments, structural materials may be added to a CMO at a plurality of locations wherein the location for each quantum of material added depends upon the orientation of the CMO. For example a CMO may be immersed in a liquid containing monomer units that photo-polymerize onto a surface exposed to radiation. A CMO is oriented to direct the surface normal of a first surface location of the CMO in the direction of a radiation source. The radiation source projects a first pattern of radiation onto the first surface location and a layer of monomers polymerize to the first surface location in accordance with the first radiation pattern. The CMO is then rotated to direct the surface normal of a second surface location toward the radiation source. The radiation source projects a second pattern of radiation onto the second surface location and a layer of monomers polymerize to the second surface location in accordance with the second radiation pattern. By repeating this process, it is possible to add material to any part of an object and from any direction from the perspective of a frame of reference attached to the object. The size of a fabricated object is limited by the magnetic force that can be exerted on the seed CMO to orient the fabricated object. Specifically, as the mass of the fabricated object increases, more force is required to overcome the force of gravity. This limitation may be overcome by incrementally incorporating a plurality of CMOs within the fabricated object so as to maintain the force to mass ratio within an acceptable range. The CMO is in this case is functionally equivalent to a goniometer, except that there is no material connection with a base so that material may be added from any direction.

In an important embodiment that may be used in combination with any of the preceding or following embodiments, a CMO includes an integral light source such as a LED or a laser; the CMO is positioned and oriented relative to a workpiece by a sequence of applied magnetic fields; and upon receiving a signal, said light source emits light toward a location on the workpiece causing photo-polymerization at the location. In this embodiment a plurality of CMOs may act on different locations on a workpiece simultaneously: that is material may be added to the workpiece in three dimensions simultaneously. This arrangement is an advance on prior art methods in which material is added only in a single plane. This arrangement brings the light source proximate to the workpiece allowing material to be added by photo-polymerization within a bath of absorbing fluid. This overcomes a limitation in prior art that the range of the photo-polymerization process is limited by the absorption of the fluid bath.

In an important embodiment that may be used in combination with any of the preceding or following embodiments, a CMO includes an integral light source such as a LED or a laser; the CMO is positioned and oriented relative to a tissue by a sequence of applied magnetic fields; and upon receiving a signal, said light source emits light toward a location on the tissue to perform an operation at the tissue location. The amplitude of applied magnetic fields at the tissue location may be enhanced with a magnetic flux directing means placed proximate to the tissue. The operation at the tissue location may for example be to heat or oblate cells at the tissue location, killing or inactivating said cells. The cells in this case may for example be diseased or cancerous cells. The operation at the tissue location may for example be photo-activation of a drug or therapeutic agent.

In an embodiment that may be used in combination with any of the preceding or following embodiments, the CMO is positioned and oriented by an external magnetic field to change the path of radiation incident on the CMO by reflection from a portion of the CMO.

In an important embodiment that may be used in combination with any of the preceding or following embodiments, a transformative operation is performed on the CMO wherein a flux of particle chosen from the list of photons, electrons, protons, neutrons, ions and atoms are incident on a location of the CMO and change a property of material at a location on the CMO. For example, UV photons may be incident at a location on the CMO and cause material at said location to polymerize. For example, electrons may be incident on a CMO may change the net charge on the object thereby changing the magnitude of a Lorentz force acting on the CMO. For example, a flux of protons incident on the CMO may be used to change the pH and thereby reactivity or optical properties of molecules on the surface of the CMO. For example neutrons incident on the CMO may be absorbed by atomic nuclei to change isotope to catalyze nuclear fission, or to cause emission of a gamma ray (neutron activation spectroscopy). For example ions incident on a CMO may be used to dope a semiconductor on the surface of the CMO thereby changing electronic and optical properties. For example, atoms may be sputtered onto a location on the CMO to form a reflective coating.

In an important embodiment that may be used in combination with any of the preceding or following embodiments, the CMO is positioned and oriented by a magnetic field to change at least one property of a fluid flow. For example a CMO may be positioned in a micro-fluidic channel to block flow in a first orientation perpendicular to a channel wall and to pass flow in a second orientation parallel to a channel wall. For example a CMO may be positioned at the intersection of a plurality of channels and by changing orientation select a first channel fluid flows from and a second channel fluid flows to. In some embodiments, the CMO may include an orifice along a first axis wherein fluid flows through the orifice if the CMO is in a first orientation in a channel and fluid does not flow through the orifice if the CMO is in a second orientation.

In an important embodiment that may be used in combination with any of the preceding or following embodiments, an optical element is integral to the CMO and the CMO is positioned and oriented by a magnetic field to change at least one property of a flux of photons. For example, the optical element may be an absorbing material and the CMO is positioned and oriented to block the path of light incident on said optical element. For example the optical element may be a mirror and the CMO is positioned and oriented to reflect light incident on said optical element from a first direction to a second direction. Further, the mirror element may have a curved surface with a focal point either in front of the mirror surface or behind the mirror surface. For example the optical element may be a diffraction grating and the CMO is positioned in the path of incident light propagating in a first direction and oriented to select a wavelength range diffracted in a second direction. For example, the optical element may be a lens the CMO is oriented along the axis of incident light and positioned to focus light at a location. For example the optical element may be a prism and the CMO is positioned and oriented to select the angle of incidence of light. For example, the optical element may be a band pass filter and the magnetic is positioned and oriented to select a range of wavelengths that is transmitted.

In an important embodiment that may be used in combination with any of the preceding or following embodiments, a CMO includes an integral aperture and by positioning and orienting the CMO with a magnetic field said aperture is positioned and oriented proximate to a sample material; light is incident on the aperture and light transmitted through the aperture or reflected from the aperture is measured and analyzed to provide information about the sample material. If the aperture is larger than the wavelengths of incident light, a propagating wave travels through the aperture and is incident on the sample material. In this case light transmitted by the sample material and light reflected or scattered by the sample material may be measured and analyzed to provide information about the sample material. If the aperture has dimensions smaller than the wavelength of incident light, an evanescent non-propagating wave that decays exponentially with distance from the aperture is present and may interact with and be absorbed by sample material immediately proximate to the aperture. The energy loss via the evanescent wave may be measured and analyzed to provide information about the sample material in a small region proximate to the aperture. The CMO may be translated relative to the sample material to measure a sequence of sample regions smaller than the wavelength of incident light. The sample material may for example be a cell wherein the incident light is mid infrared radiation with wavelengths greater than 4 microns and the aperture dimension is less than 1 micron. The distribution of protein, carbohydrate, lipid, nucleotides and other biological molecules within the cell may be measured with sub micron resolution with this arrangement.

In an important embodiment that may be used in combination with any of the preceding or following embodiments, a measurement operation is performed at a location on the CMO wherein a flux of particles is incident upon said location, interacts with material at said location thereby changing at least one property of the flux of particles, and subsequent to said interaction the modified particle flux is measured and analyzed to provide information about the material at a location on the CMO. The material at the location may be a sample material attached to the CMO or a material from which the CMO is comprised.

In a most preferred embodiment, a CMO is directed to a sequence of different orientations by magnetic forces and for each orientation radiation is directed toward a sample material attached to the CMO and radiation scattered, reflected or emitted by said common portion of CMO is measured by a detector and the measurements for all orientations in the sequence are analyzed to provide information about the sample material. In this embodiment, the CMO functions as goniometer platform operable to point the surface normal at any location on the CMO in any direction and to rotate the CMO about said surface normal. It is convenient to use the propagation direction and polarization vectors of incident radiation as an orthogonal frame of reference and rotate the CMO relative to this frame of reference. In this case orientation of the CMO may be described by a set of three Euler angles. This feature is valuable because the measured values for many types of physical measurements depend upon the relationship between the direction of incidence, the directions of axes within the geometric arrangement of atoms in a sample material, and the direction of observation. The arrangement of the present invention provides a means to systematically vary the directions of incidence and observation, analyze measurements for a plurality of directions, and obtain more comprehensive information about the sample material.

Molecules on a surface may have a preferred orientation relative to surface features due to interactions between the local surface charge density and molecular charge density. Molecular electronic and vibrational transition moments are at energies and geometry specific to the molecule and surface. This embodiment provides a means to systematically vary the angle of incidence for incident radiation by rotating the CMO through a sequence of orientations and thereby to measure different molecular transition dipole moments. The portion of a CMO may for example be an area of the surface, a plane or a facet. For example the CMO may be a flake with a first and second planar surface and an irregular edge between the planar surfaces. The CMO in this case undergoes a sequence of orientations that vary the angle of incidence of radiation on the first surface and a second sequence of orientations that vary the angle of incidence of radiation on the second surface. The measurements from the first surface are analyzed as a first set to provide information about a material of the first surface and measurements of the second surface are analyzed as a set to provide information about material of the second surface.

In an embodiment that may be used in combination with any of the preceding or following embodiments, a beam of radiation is directed toward a CMO and radiation diffracted, reflected or refracted by a facet or portion of CMO is detected and analyzed to provide information about the orientation of optical or crystallographic axes of said portion of the CMO. The radiation can be for example visible light to determine an optical axes or x-rays to determine crystallographic axes.

The particle flux may for example be x-rays or thermal neutrons or electrons which are diffracted by the atomic structure at a location on the magnetic particle for a plurality of orientations and the diffracted x-rays or thermal neutrons or electrons are analyzed for a plurality of orientations to provide information about the ordering of said atomic structure. The wavelengths of the x-rays and neutrons may for example fall between 0.3 nm and 50 nm.

The particle flux may for example be UV photons with wavelength between 50 nm and 400 nm that excite fluorescence spectra from molecules on the CMO and the fluorescence spectrum is analyzed to provide information about said molecules.

The particle flux may for example be visible light photons with wavelengths between 400 nm and 650 nm that excite Raman scattering from materials at a location on the surface of the CMO. Raman scattering is described by a tensor that depends upon the direction of illumination, the polarization of the incident flux, the direction of the measured flux, and the polarization of the measured flux. The arrangement of the present embodiment provides the means to systematically measure most or all of the Raman tensor elements to provide detailed information about the molecular structure and orientation of the sample material.

The particle flux may for example be near infrared photons with wavelengths between 650 nm and 2500 nm that are absorbed by overtone and combination bands of mineral materials at a location on the magnetic particle and said absorption spectra are measured and analyzed to provide information about the minerals. Near infrared (and mid infrared and far infrared) absorptions depend upon the directions of dipole transition moments and hence are sensitive to changes in orientation. The arrangement of the present embodiment provides the means to systematically vary angles of incidence to obtain detailed information about the molecular structure and orientation of the sample material.

The particle flux may for example be mid infrared photons with wavelength between 2500 nm and 25000 nm that are absorbed by cells on the CMO and the absorption spectra of the cells are analyzed to provide information about the species, growth phase, and viability.

The particle flux may for example be far infrared photons with wavelengths between 25 microns and 1000 microns that are absorbed by protein molecules at a location on the CMO and the absorption spectra are measured and analyzed to provide information about intermolecular interactions and skeletal modes.

In an important embodiment that may be used in combination with any of the preceding or following embodiments, the near field amplification device is integral to a surface face of the CMO. In some embodiments the CMO has a plurality of faces and a different type of near field amplification device is integral to each face. In other embodiments the same type of near field amplification device is integral to each face. In some embodiments a near field amplification device is integral to some faces of the CMO and is not present on other faces of the CMO.

In an important embodiment that may be used in combination with any of the preceding or following embodiments, an array of one or more near field amplification devices is at a fixed location separate from the CMO and the CMO is translated to bring the sample material attached to the CMO proximate to each near field amplification device of the array. The array of near field amplification devices may include a noble metal needle tip of a design known to produce tip enhanced Raman scattering. The tip is typically tens of nanometers in diameter and the enhancement effect is of the same scale providing spatial resolution potentially much better than the wavelength of the electromagnetic radiation used for measurement. Near field amplification devices may be purchased from commercial vendors.

In an important embodiment that may be used in combination with any of the preceding or following embodiments, a plurality of locations on a CMO are brought into positions proximate to a near field hot spot at different times and measurement is made for each location. The term "hot spot" refers to a spatial region of a near field enhancement device that produces greater near field enhancement than other regions of the near field enhancement device.

In an important embodiment that may be used in combination with any of the preceding or following embodiments, the near field enhancement device is comprised of an array with a plurality of regions wherein the near field enhancement parameters of each region are different. For example the plasmon resonance frequencies may be different. In this embodiment, a location on the CMO with a material to be measured is brought to a position proximate to at least two different near field enhancement regions at different times and a measurement is made of the material at each region. For near field enhancement, the term proximate means a distance between the material to be measured and a surface feature of the near field amplification device of less than 500 nanometers and preferably less than 100 nanometers.

In an embodiment that may be used in combination with any of the preceding or following embodiments, radiation from radiation device may interact with material of a CMO to catalyze a chemical reaction or to promote electrons to an excited atomic or molecular energy level, or to promote stimulated emission from an excited energy level. The radiation could for example be used to photo polymerize a portion of material on the CMO. The radiation at a first wavelength could for example be used to excite fluorescent emission at a second wavelength. The radiation could be used for example to trigger a flash of stimulated emission.

In an embodiment that may be used in combination with any of the preceding or following embodiments, the radiation device is a laser that directs polarized quasi-monochromatic radiation onto a portion of a CMO and the Raman scattered radiation from the CMO is measured with a spectrometer. Raman scattering is in general a tensor dependent upon the polarization, angle of incidence to analyte species molecular axes and the angle between incidence and observation. By varying the geometry of observation as discussed above, the present method provides a means to distinguish between the signals from molecular transitions with similar energy but different geometric dependencies.

In an embodiment that may be used in combination with any of the preceding or following embodiments, the orientation of the CMO is varied and an electric field is generated in the region of the CMO that perturbs the energy levels of molecules adsorbed to CMO (Stark Effect) in combination with the surface effect and radiation reflected scattered or emitted from the CMO is analyzed to provide information about material on the CMO.

In an embodiment that may be used in combination with any of the preceding or following embodiments, the orientation of the CMO is varied and an magnetic field is generated in the region of the CMO that perturbs the energy levels of molecules adsorbed to CMO (Zeeman Effect) in combination with the surface effect and radiation reflected scattered or emitted from the CMO is analyzed to provide information about material on the CMO.

In an important embodiment that may be used in combination with any of the preceding or following embodiments, the CMO includes a reservoir for a catalyst material and the catalyst material is released proximate to a substrate causing material to be added to the substrate.

In accordance with an important optional feature of the invention which can be used independently with any of the above or following features, a means to cause relative motion between the CMO and a workpiece is provided. In some embodiments the relative motion is rotational, in some embodiments the relative motion is translational, and in some embodiments the relative motion is both rotational and translational. In some embodiments a time dependent external magnetic field translates and/or rotates a magnetic object within a defined volume containing at least part of a workpiece. In some embodiments the workpiece further translates and/or rotates relative to the defined volume of the time dependent external magnetic field. For example, the arrangement of the invention may function in the same manner as a conventional lathe or milling machine except that the CMO is a tool and the time dependent external magnetic field performs the same function as the tool holder in the conventional machine. The present invention has the advantage that the tool path is not constrained by interference between the tool holder and workpiece or interference between a conventional tool shaft and workpiece.

In an embodiment that may be used in combination with any of the preceding or following embodiments, the CMO includes integral cutting surfaces and is functionally a cutting tool. A time dependent magnetic field is projected into a workpiece controls the motion of the cutting surfaces of the CMO within the workpiece. In some embodiments the cutting tool is further a composite magnetic object comprised of different portions that perform the separate functions of (i) interacting with an external magnetic field to provide a force and/or torque on the cutting tool; (ii) cutting, abrading or remodeling material of a workpiece; (iii) provide a structural connection between portions (i) and (ii).

In an embodiment that may be used in combination with any of the preceding or following embodiments, the CMO includes a set of magnetic moments that function as a magnetic bearing to constrain the center of mass of the CMO to a user selected time dependent path relative to a workpiece frame of reference and rotation of the CMO to rotation about time dependent user selected axis. The position of the CMO center of mass and axis of rotation at any instant in time are determined by the direction of a temporally varying external magnetic field applied at the position of said magnetic bearing moments.

In an embodiment that may be used in combination with any of the preceding or following embodiments, the complex magnetic object includes a set of magnetic moments that function to produce a torque to rotate the complex magnetic object. For example, the workpiece may be comprised of non-magnetic plastic or ceramic and the cutting tool may be comprised of magnetized steel. The cutting tool may further have one or more permanent magnetic moments that interact with an applied magnetic field. The cutting tool may be made to oscillate, rotate, or translate under the influence of a time varying magnetic field so as to remove material from the target object. Further the cutting tool may cut in any direction without the constraint of a shaft. For example, a drilling operation may follow a curved path that would not be possible with a conventional straight drill. For example, a coiled tube could be cut in the interior a solid block with the present method.

The time varying magnetic field in general is the vector sum of four components. The first magnetic field component is temporally adjusted to at a first frequency generate a force on the CMO that opposes displacement from a position on a tool path. The second applied magnetic field component is temporally adjusted at a second frequency to change the position of the CMO on a tool path. The third applied magnetic field component is temporally adjusted at a third frequency to generate rotation of the CMO about an axis. The fourth applied magnetic field may be adjusted at a fourth frequency to alter the axis of rotation of the CMO.

DETAILED DESCRIPTION

Figure 1:
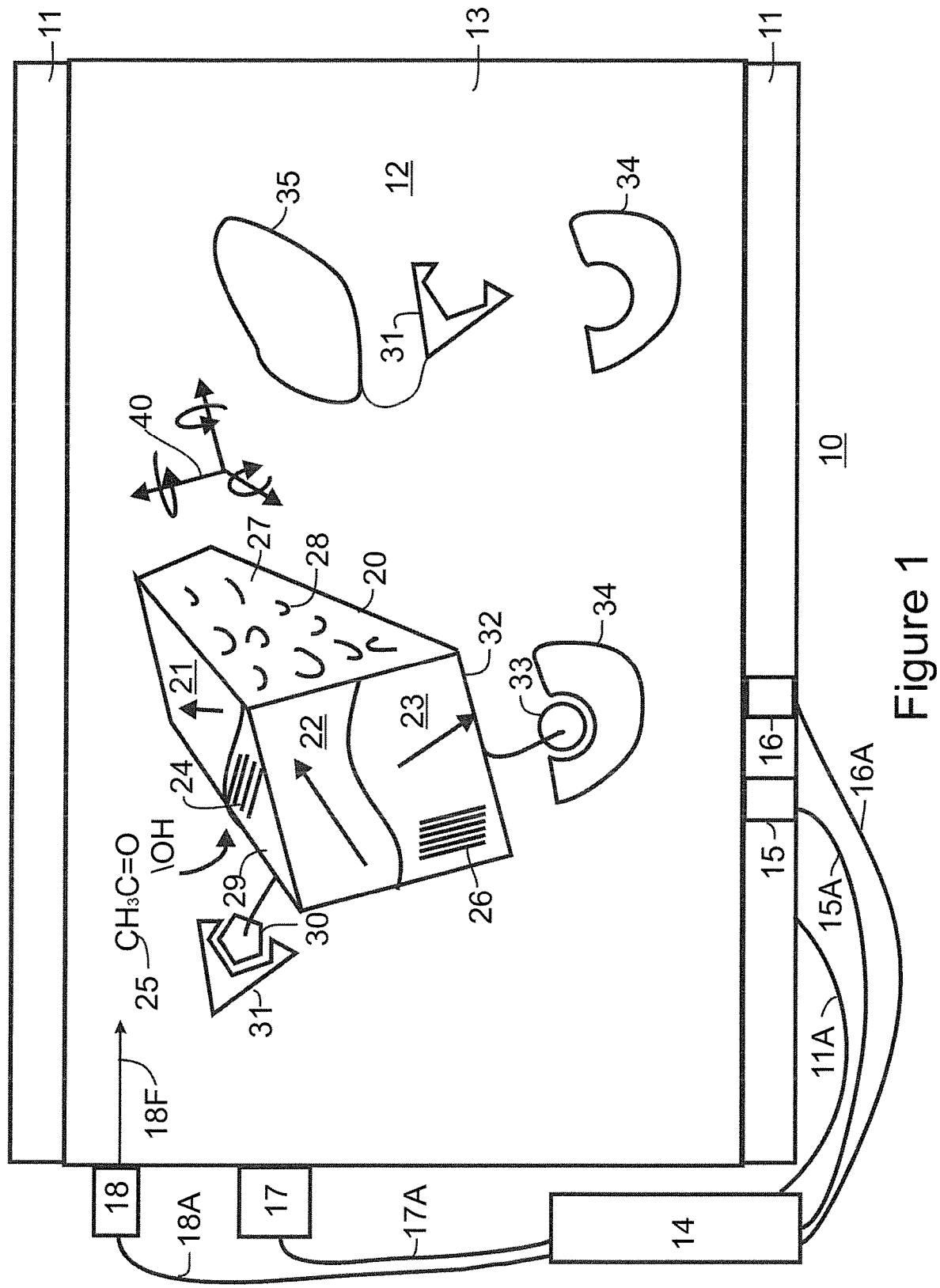
FIG. 1 shows a programmable magnetic array with a channel containing a CMO.

FIG. 1 schematically shows the main components of the magnetic goniometer arrangement shown generally at 10. Magnetic fields are generated by array 11 surrounding channel 13 containing liquid 12. The magnetic array 11 is linked with control means 14 by cable 11A. Control means 14 operates to generate a spatially and temporally varying magnetic field in channel 13 that is measured by magnetic sensor 15 linked with control means 14 by cable 15A. Magnetic array 11 may optionally include means to generate an electric field that is measured by electric field sensor 16 linked with control means by cable 16A. The location and orientation of CMO 20 is measured by sensor 17 linked to control means 14 by cable 17A. Sensor 17 may for example be an optical sensor such as a camera. Control means 14 is linked with radiation source 18 by cable 18A. Radiation source 18 directs a flux of particles 18F toward a location in the channel 13 that may or may not coincide with the location of CMO 20. The flux of particles may be photons, neutrons, electrons, protons, atoms, ions, molecules or combinations thereof.

CMO 20 as shown is has three magnetic domains indicated at 21, 22 and 23 with magnetic moments in non-collinear directions. The spatially varying magnetic field generated by magnetic array 11 interacts with the magnetic moments of CMO to produce forces and torques that operate to translate and rotate CMO 20 toward a desired position and orientation. CMO 20 may have three translational and three rotational degrees of freedom as indicated at 40. In some embodiments, one or more degrees of freedom are limited by a physical constraint such as for example the channel wall. CMO 20 must include at least two non-collinear magnetic moments to be oriented by a spatially varying magnetic field. CMO has a plurality of facets and each facet may have different surface properties. For illustrative purposes, five different facet surfaces are shown. Different facet surfaces are possible and within the scope and spirit of the invention.

As indicated at 24 and 26, each facet may lie on a different crystallographic plane and interact differently with a sample molecule 25. The crystal planes for facets 24 and 26 could for example be <1,0,0> and <1,1,1>, respectively. A sample molecule in solution 25 (in this example acetic acid, but may in general be any molecule) may be adsorbed to the crystallographic plane of each facet. In general, the quantum states of an adsorbed molecule interact with quantum states of the substrate crystal causing the adsorbed molecule to have a preferred orientation with respect to the surface normal and a spectrum unique to the surface for each angle of incidence. That is the same type of sample molecule 25 will have different spectra for each angle of incidence and for each facet 24 and 26.

Facet 27 includes surface texture features 28 that function to locally amplify and concentrate the electric field of an incident electromagnetic wave. The surface features are those known in the art to produce surface enhanced Raman spectra and surface enhanced infrared spectra. A review of the literature is beyond the scope of this document, but it is worth noting that the surface enhancement features can be engineered and fabricated in a manner that provides selective enhancement of spectral features. In the context of the present invention, different types surface enhancement features may be placed on different facets of a CMO so that each facet selectively amplifies a different spectral feature.

Facet 29 includes tethered template structure 30 that binds specifically to template receptor 31. Facet 32 likewise includes a different tethered template structure 33 that binds specifically to template receptor 34. The template structure 30 may for example be an antibody that is specific to a particular cell type 35 with (template) receptor 31. The template structure 33 may for example bind with a macromolecule in solution 34. The template structure may for example be a functional group that preferentially retains polar molecules. Any type of template structure can be used. All that is required is that the template structure has a higher affinity for a first type of molecule than a second type of molecule. The CMO may include a plurality of different template structures on different facets.

The magnetic goniometer of the present invention provides a means to measure the spectra of a sample molecule 25 for a plurality of angles of incidence for a plurality of different facets. The plurality of different spectra from a plurality of different facets and angles of incidence may be compared with a spectral database to uniquely identify the sample molecule 25. This feature is particularly useful for distinguishing between different types of biological macromolecules that in solution have similar and perhaps indistinguishable spectra. The spectra of a sample molecule are measured by the steps of:

1. Place a CMO in a reference solution.
2. With control means 14 generate a sequence of spatially varying magnetic fields with magnetic array 11 causing CMO 20 to position and orient a first facet at a first angle of incidence and measure a reference spectrum.
3. Repeat step 2 for sequence of second facets and a sequence of second angles of incidence for each facet.
4. Add the unknown sample molecule to the solution and adjust the solution parameters (temperature, pH, ionic strength, etc.) to produce conditions conducive to the adsorption of a suspected type of sample molecule onto a plurality of facets on the CMO.
5. With control means 14 generate a sequence of spatially varying magnetic fields with magnetic array 11 causing first facet of CMO 20 to position and orient relative to radiation source 18 and sensor 17 such that radiation is incident on the first facet at a first angle of incidence and sensor 17 receives reflected, transmitted or scattered radiation from the sample molecule to produce a first spectrum.
6. Repeat step 5 for a sequence of second facets and a sequence of second angles of incidence.
7. In the control means 14, remove the spectral contribution of the solution and facet substrate to leave the molecular spectrum for each facet and angle of incidence. In some cases the molecular spectrum may be absent or very weak because the molecule adsorbed weakly or not at all.
8. Compare the plurality of spectra from a plurality of facets and plurality of angles of incidence with a spectral database to provide information about the type and quantity of sample molecule. The absence of adsorption may be used as an indicator to limit the number of possible matches in the spectral database.

In another embodiment, each orientation region 24, 25 or facet 27, 29, or 32 of CMO 20 may be selective for a different type of sample material. Each facet or orientation region in this embodiment carries a different test and the CMO is oriented in a sequence to read each test result.

Figure 2:
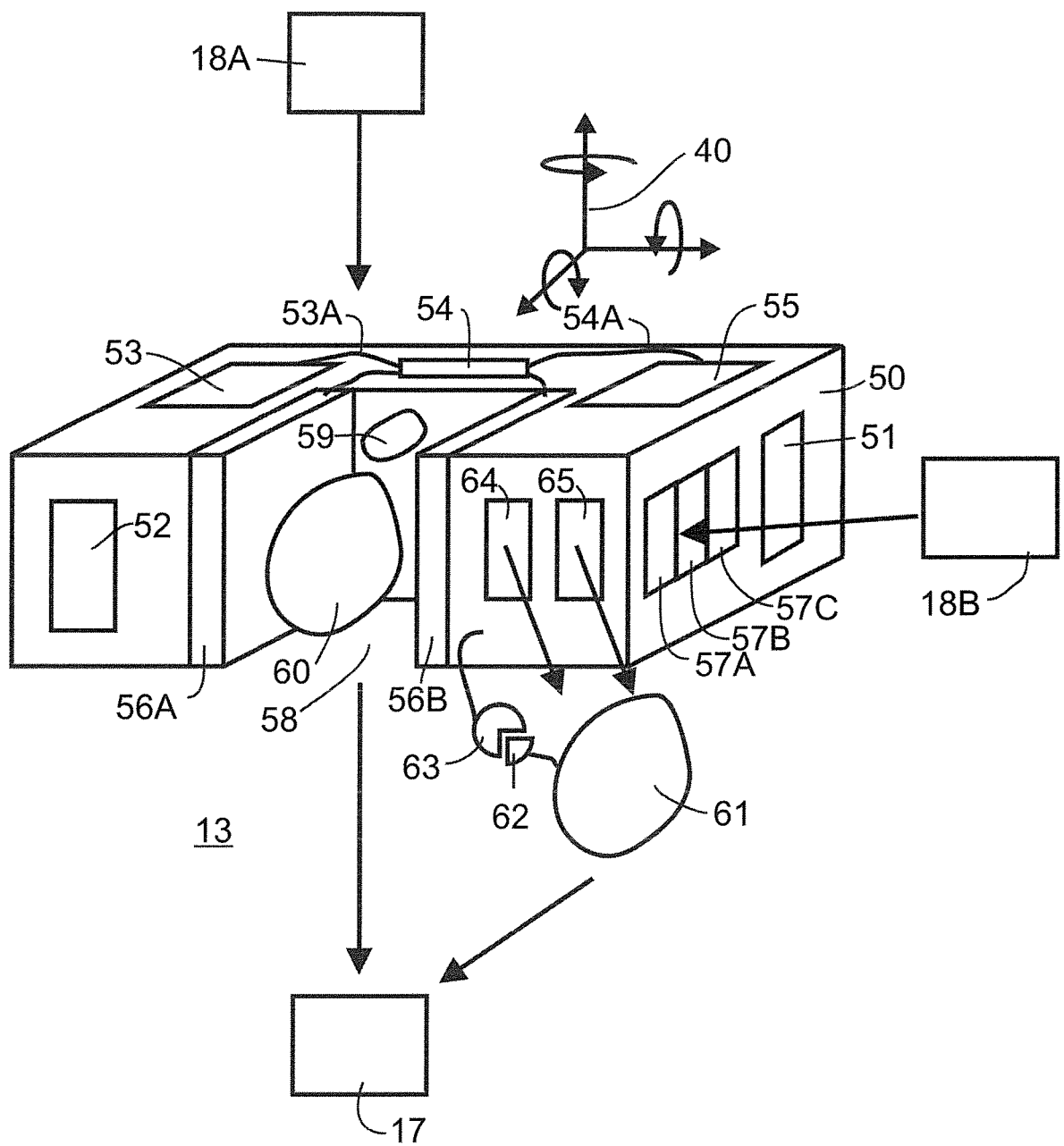
FIG. 2 shows a CMO configured for measuring spectral properties of a cell.

FIG. 2 shows an expanded view of CMO 50 in chamber 13 of FIG. 1. As a non-limiting illustrative example, the sample material is a biological cell. Other types of sample material may be used with the arrangement shown in FIG. 2. CMO 50 includes magnetic domains 51 and 52 with different non-collinear magnetic moments. The magnetic moments of the domains 51 and 52 interact with a spatially and temporally varying magnetic field produced by magnetic array 11 on FIG. 1 to produce net forces and torques that translate and rotate CMO 50. The CMO 50 has six degrees of freedom for positioning and orienting as indicated at 40.

CMO 50 includes an energy reservoir 53 linked with electric generation means 54 by conduit 53A. Energy generation means 54 is linked with control circuit 55 by cable 54A and conductive plates 56A and 56B. Energy reservoir may receive energy from photodiode 57A illuminated by light source 18B. Light source 18B may be modulated to provide both logic signals to control 55 and energy to energy reservoir 53. Control circuit 55 may receive logic signals derived from modulation of photodiode 57A or from an integral receiver. Control 55 may include circuit to sense a change in the capacitance of plates 56A and 56B due to the change in dielectric constant with a cell 60 in the gap 58 between the plates. The cell 60 in gap region 58 is irradiated by radiation from radiation source 18A and scattered, transmitted or reflected radiation is received by radiation detector 17. As indicated at 59, the gap region may include a reservoir of a labeling substance that is released into or proximate to cell 60 upon command by control 55, for example by sensing a change in capacitance across gap 58. The labeling substance may for example be an isotopic marker, a fluorescent marker, or a dye. The labeling substance may be in a form that metabolized by the cell and the products of metabolism contain a label. For example, a metabolic pathway may be labeled by introducing a carbohydrate food source in which particular atomic positions are labeled with isotopes of C, H or O. Spectral features of metabolic products labeled with the isotopes are shifted in frequency and detected on the basis of frequency shift.

CMO 50 may include a tethered template 63 that binds with antigen 62 tethered to surface of cell 61. The antigen 62 may be integral to the cell surface or tethered to an integral cell material. Cell 61 may be illuminated by light sources 64 and 65 which are integral to the CMO. Light source 64 may be a non-linear optical material that mixes photons received from light source 18B to produce photons with shifted frequency. Light source 65 may be a thermal source, LED or laser device that is energized by energy converter 54 under the control of control means 55. Electromagnetic radiation from light sources 64 and 65 is emitted proximate to cell 61, interacts with biological macromolecules of the cell changing the spectral content, and the changed spectral content is measured by detector 17.

In another arrangement radiation from source 18B is directed through window 57C to illuminate cell 60 in gap region 58 and scattered, transmitted or reflected radiation is received by detector 17.

CMO 50 may include a non-linear optical material 57B that receives a first photon with a first energy and a second photon with a second energy from light source 18B and emits a third photon with a third energy from port 64 in the direction of cell 61 or in the direction of cell 60 (not shown). In both cases, scattered, transmitted or reflected radiation is received by detector 17.

The detector 17 is any device that receives radiation and produces a signal related at least in part to at least a part of the received radiation. The detector may for example be a photodiode. Preferably detector 17 is a spectrometer that analyzes the radiation power received as a function of radiation wavelength, frequency or energy. The radiation may be any particle type including photons, electrons, neutrons, protons, ions, atoms, and molecules.

Control circuit 55 may cause a voltage to be applied across plates 56A and 56B from power generator 54 producing an electric field between the plates. The gap between the plates may approximate the size of the object to be measured. For a bacteria cell the gap may for example be in the range of 5 to 10 microns. For eukaryotic cells the gap may for example be in the range of 10 to 100 microns. Because the gap is relatively small, even a modest voltage difference of a few volts will produce a substantial electric field on the order of 100,000 V/m or more. The applied electric field may be used to lift degeneracy of quantum states in the sample material via the Stark Effect thereby providing a richer spectrum with more information.

Figure 3:
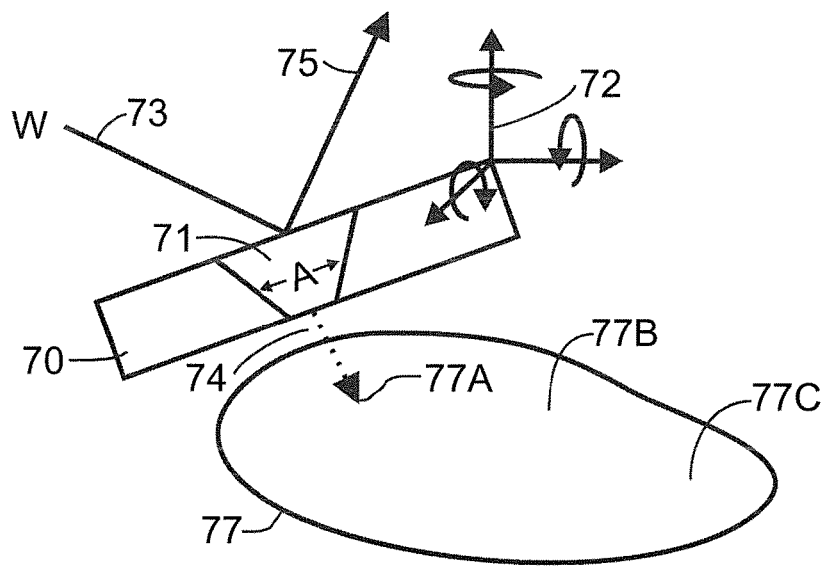
FIG. 3 shows an arrangement for measuring a sample object with super resolution using a CMO with an aperture.

FIG. 3 shows an expanded view of CMO 70 with aperture 71 within the arrangement of FIG. 1. As a non-limiting illustrative example, the sample material is a biological cell. Other types of sample material may be used with the arrangement shown in FIG. 3. Control means 14 generates signals to magnetic array 11 producing a spatially and temporally varying magnetic field that generates forces and torques on CMO 70 that translate and orient CMO proximate to a location 77A on the surface of biological cell 77. As indicated at 72, CMO 70 may be translated in any direction and rotated about any axis by spatially and temporally varying magnetic fields generated by magnetic array 11 controlled by control means 14. Electromagnetic radiation of wavelength W is incident on aperture 71 of diameter A as indicated at 73 and electromagnetic radiation is reflected in the direction indicated at 75. The electromagnetic radiation wavelength W may be for example in the mid infrared range of 2.5 microns to 25 microns with aperture diameter A is less than 1 micron. In this example the aperture is smaller than the wavelength. Consequently wave 73 does not propagate through the aperture, but an exponentially decaying evanescent wave extends beyond the aperture 71 as indicated at 74 and penetrates the surface region of biological cell 77 in the region 77A. The evanescent wave 74 may interact with biological molecules proximate to surface location 77A over a region corresponding to the aperture size with some loss of energy at wavelengths that correspond to internal vibrations of the biological molecules. The reflected propagating wave 75 from aperture 71 in general has less energy at selected wavelengths than the incident wave 73 due to energy lost by the evanescent wave. Control 14 may cause magnetic array 11 to generate a sequence of magnetic fields that cause CMO to reposition and re-orient at a sequence of locations indicated at 77A, 77B, and 77C on the surface of biological cell 77 to produce a spectral map of the biological cell 77. Although the example given is for mid infrared spectroscopy, the technique described herein may be used with other wavelength ranges by scaling the aperture size to less than the measurement wavelengths. For example, a dye fluorescing at 500 nm could be mapped with 100 nm resolution by using a 100 nm aperture. Because the spatial resolution of the spectral measurements is smaller than the wavelengths used for the measurements, the term "super resolution" applies.

The depth of penetration of the evanescent wave 74 depends upon the ratio of wavelength to aperture size as well as details of the refractive index, angle of incidence and aperture geometry. The depth of penetration decreases as the wavelength to aperture size ratio increases. The depth of penetration decreases as the angle of incidence increases. These properties may be exploited to obtain a depth profile by using a plurality of apertures of different sizes and/or a plurality of different angles of incidence. A three dimensional super resolution spectral map of the sample material may be built up by combining depth profiling with super resolution spatial mapping. In an embodiment not shown the CMO may include a plurality of apertures of different sizes and the aperture size employed for a spectral measurement is determined by the position and orientation of the CMO. In another embodiment not shown, a plurality of CMOs with a plurality of aperture sizes are each positioned and oriented relative to a sample material position and a spectral measurement is made with each aperture size. In another embodiment not shown, the aperture is elongated along a first polarization direction of an incident wave such that the spatial resolution is different along the first polarization direction than along a second orthogonal polarization direction. In another embodiment not shown, the aperture 71 comprises a plurality of apertures and the plurality of apertures collectively determines the spatial extent of the evanescent wave.

Figure 4:
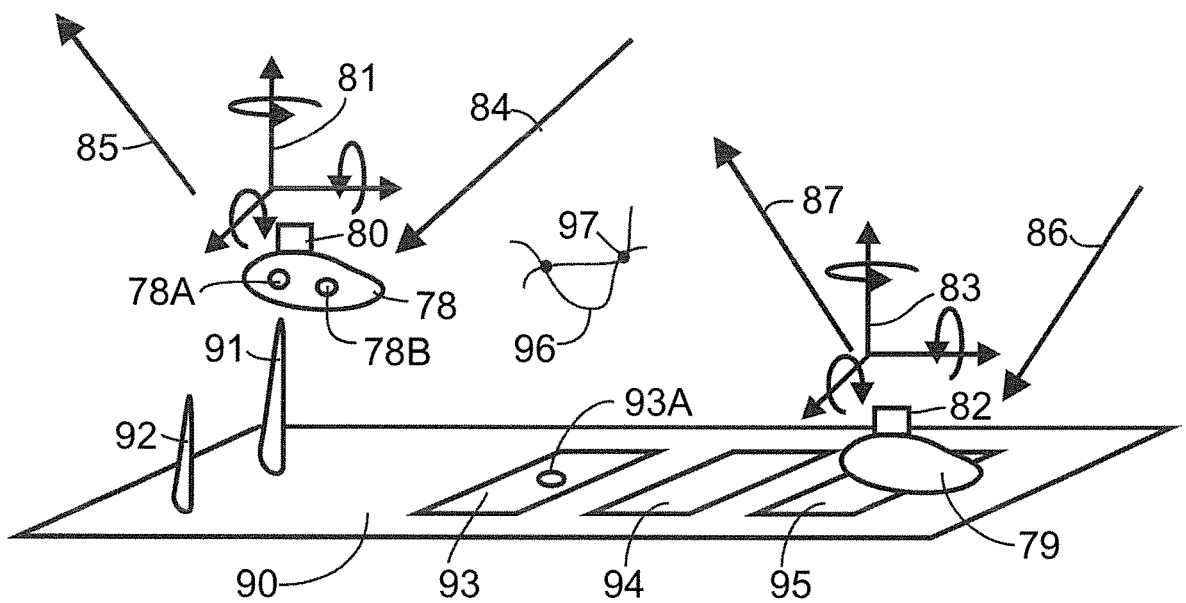
FIG. 4 shows an arrangement for measuring surface enhanced spectra of a sample object.

FIG. 4 shows an arrangement for surface enhanced Raman spectroscopy and surface enhanced infrared spectroscopy using the magnetic goniometer of the present invention. The magnetic goniometer and functions to translate and orient sample material relative to a surface feature "hot spot". Surface feature hot spots may enhance a spectral feature by several orders of magnitude by spatially concentrating the electric field of incident electromagnetic radiation. Example surface enhancement features are shown at 91, 92, 93, 94, and 95 on substrate 90. The enhancement features are best fabricated with Ag, Au, Pt and combinations thereof. Features 91 and 92 are needles with different geometry designed and fabricated to enhance different spectral features. The tip diameter of features 91 and 92 may be on the order of tens of nanometers. Regions 93, 94 and 95 have different surface textures. Region 93 may be coated with a random assortment of noble metal colloids, which in a particularly advantageous random combination produce a region of maximal spectral enhancement ("hot spot") at 93A. Regions 94 and 95 are designed and fabricated to enhance different spectral features by including surface features with plasmon resonance frequency in the same range as the spectral features to be enhanced. That is specific spectral features can be selectively enhanced by the choice of surface geometry in regions 94 and 95. As a non-limiting illustrative example, the sample material is a biological cell. Other types of sample material may be used with the arrangement shown in FIG. 4.

In FIG. 4, CMO 80 is bound to biological cell 78 as best illustrated in FIG. 2 by surface linkages 62 and 63. CMO 82 is similarly bound to biological cell 79. For the embodiments described in FIG. 4, the CMO functions as a meso-scale "tugboat" positioning and orienting a larger sample material or object. The CMO is preferably small compared with the sample object in this case so as not to block the field of view of the sample material or object for spectral measurements. Control means 14 generates signals to magnetic array 11 producing a spatially and temporally varying magnetic field that generates forces and torques on CMOs 80 and 82 that translate and orient CMOs 80 and 82 relative to substrate 90. As indicated at 81 and 83, CMOs 80 and 82 respectively may be translated in any direction and rotated about any axis by spatially and temporally varying magnetic fields generated by magnetic array 11 controlled by control means 14.

CMO 80 tows biological cell 78 to position location 78A on the cell surface proximate to needle 91. Electromagnetic radiation is incident as shown at 84 and interacts with needle 91 and proximate region 78A to produce scattered and reflected electromagnetic radiation indicated at 85 which is measured and analyzed by a spectrometer (not shown). The region of maximal interaction is confined to a small volume proximate to the tip of needle 91, which may have dimensions on the order of tens of nanometers. During a spectral measurement of cell region 78A, a biopolymer gel may be formed in solution 12 by adjusting temperature and/or ionic strength to cause junction zones 97 to form in biopolymer strands 96 thereby forming a gel that restrains mobility of the cell-CMO complex. It should be noted that the method described here may be used to probe the gel itself with fine spatial detail. The reader is referred to Prystupa et al, Polymer Gels and Networks 4 (2): 87-110 (1996) for further details about the spectral features of gels. Subsequent to a spectral measurement at cell location 78A, the temperature and ionic strength of solution 12 may be adjusted to reduce viscosity. Magnetic array 11 produces a spatially and temporally varying magnetic field that brings a second cell surface region 78B proximate to needle 91 where a second spectral measurement is made. By positioning and orienting cell 78 at a plurality of locations and orientations via CMO 80 relative to needle 91, and measuring spectra at each location, a spectral map of cell 78 can be produced. The spatial resolution of the spectral map so produced may be comparable to the scale of the needle tip 91. A spectral map emphasizing different spectral features due to the different composition and geometry of needle 92 may be acquired similarly by bringing positioning and orienting each cell region relative to needle 92 with CMO 80.

CMO 82 positions and orients biological cell 79 at surface enhancement regions 95, 94, and 93A in sequence where biological cell 79 interacts with probe radiation 86 and spectral measurements of reflected and scattered radiation 87 are made for each region. The spectral measurement at each region emphasizes a different spectral region. This feature can be used for example to distinguish between spectrally similar samples by enhancing the spectral signal at frequencies where differences exist.

Figure 5:
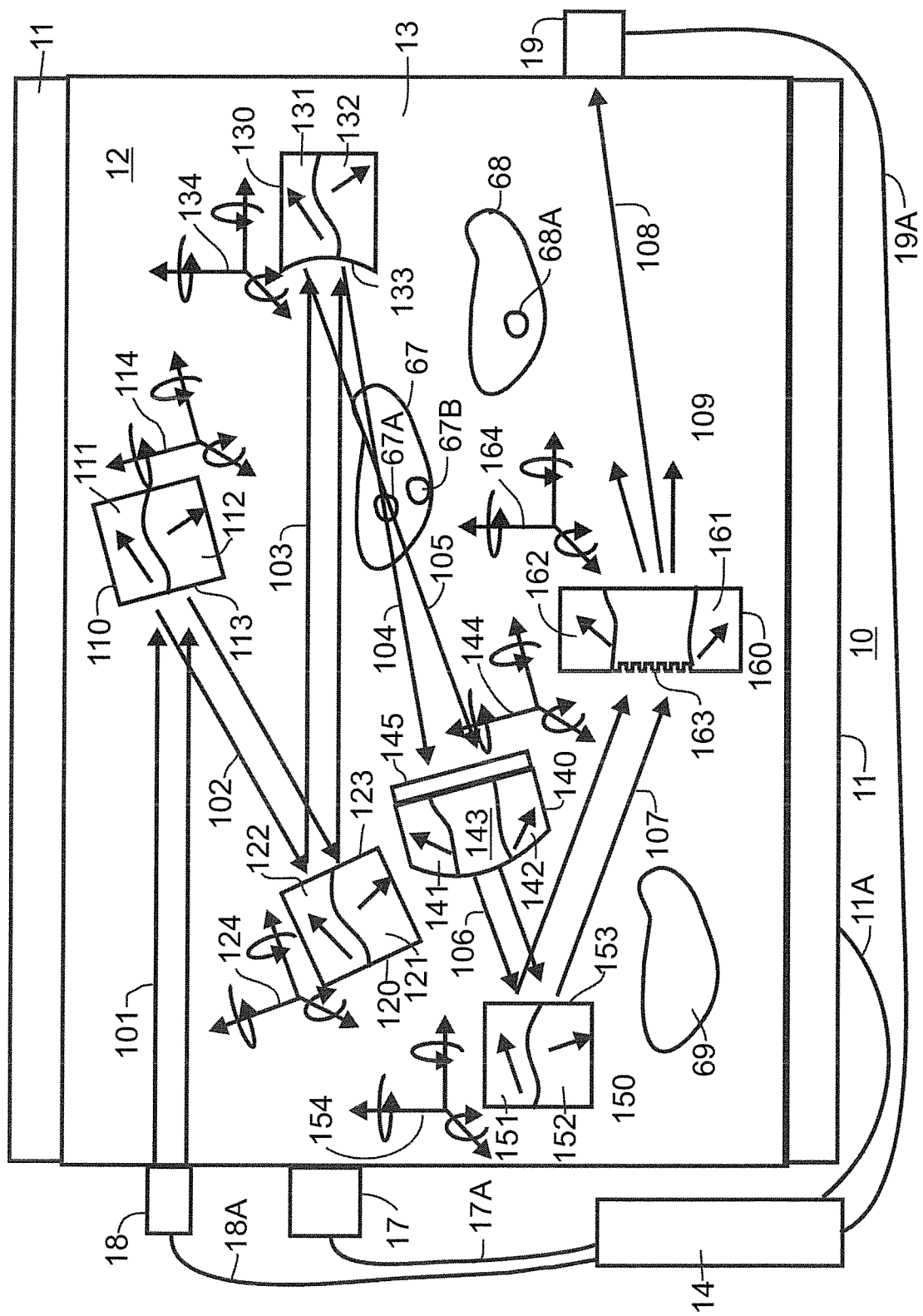
FIG. 5 shows an arrangement for measuring spectral properties of a selected object using a plurality of CMOs.

FIG. 5 shows an optical arrangement with a plurality of CMOs for measuring optical properties of a sample material. As a non-limiting illustrative example, the sample material is a biological cell. Other types of sample material may be used with the arrangement shown in FIG. 5. A target biological cell 67 is selected for examination by control means 14 from cells 67, 68 and 69 in liquid 12 using information from sensor 17. Control means 14 generates signals to magnetic array 11 producing a spatially and temporally varying magnetic field that generates forces and torques on CMOs 110, 120, 130, 140, 150, and 160 that translate and orient each said CMO within fluid 12 in container 13 to produce the optical layout shown.

As indicated at 111 and 112, CMO 110 has two magnetic domains with non-collinear magnetic moments enabling translation in any direction and rotation about any axis as indicated at 114. Radiation source 18 emits electromagnetic radiation in the direction of CMO 110 as indicated at 101 and reflects said radiation from plane reflective surface 113 in the direction 102 toward CMO 120.

As indicated at 121 and 122, CMO 120 has two magnetic domains with non-collinear magnetic moments enabling translation in any direction and rotation about any axis as indicated at 124. Radiation is reflected from plane reflective surface 123 in the direction 103 of CMO 130. The combination of two goniometer mounted mirrors 113 and 123 allows radiation to be directed toward any point in the container 13.

As indicated at 131 and 132, CMO 130 has two magnetic domains with non-collinear magnetic moments enabling translation in any direction and rotation about any axis as indicated at 134. CMO 130 includes concave reflective surface 133 that focuses radiation incident along path 103 along paths 104 and 105 which come to a focus at location 67A in biological cell 67. By adjusting each magnetic goniometer platform 110, 120 and 130, the focus can be shifted to another location 67B of cell 67 or to another cell location 68A on cell 68. Each goniometer platform is positioned and oriented independently in this arrangement provided that each platform is separated by more than the spatial resolution of the magnetic array 11. In another arrangement (not shown) magnetic platforms may be operated independently in close proximity if the number of magnetic domains and the directions of corresponding magnetic domains are different so that each behaves differently in the same local magnetic field.

As indicated at 141 and 142, CMO 140 has two magnetic domains with non-collinear magnetic moments enabling translation in any direction and rotation about any axis as indicated at 144. CMO 140 includes plano-convex lens 143 and bandpass filter 145 which filter and collimate radiation from paths 104 and 105 to collimated path 106.

As indicated at 151 and 152, CMO 150 has two magnetic domains with non-collinear magnetic moments enabling translation in any direction and rotation about any axis as indicated at 154. CMO includes reflective surface 153 which reflects incident radiation in the direction 107 toward grating element 163 mounted on CMO 160.

As indicated at 161 and 162, CMO 160 has two magnetic domains with non-collinear magnetic moments enabling translation in any direction and rotation about any axis as indicated at 164. CMO includes grating 163 which disperses radiation by wavelength along paths 108 and 109. Band pass filter 145 functions to select the grating order and prevent spectral aliasing. CMO 160 may be rotated to direct each wavelength in sequence to detector 19 in communication with control means 14 via cable 19A. In another embodiment, detector 19 is a multiplex spectrometer such as the above cited document High Efficiency Multiplex Spectroscopy.

Figure 6:
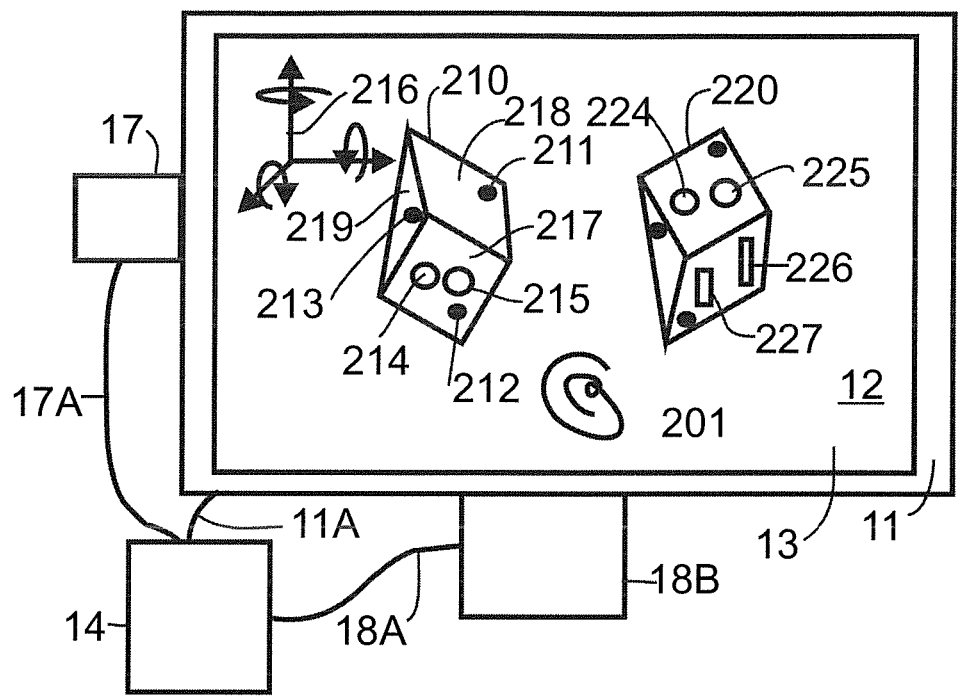
FIG. 6 shows an arrangement for three dimensional printing an object on a base of CMOs.

FIG. 6 shows an arrangement for fabricating a three dimensional object using the magnetic goniometer of the invention. In this embodiment, one or more CMOs form a scaffold onto which material is added. The number of composite objects used depends upon the forces required to position and orient the fabricated object. For a small fabricated object a single CMO may be sufficient. For a large fabricated object a plurality of CMOs may be required to overcome gravity and inertial forces. CMOs may be added incrementally during fabrication as the mass of the fabricated object increases and force requirements increase. As shown, CMOs 211, 212, and 213 form a scaffold onto which workpiece 210 is formed. Control means 14 in communication with magnetic array 11 via cable 11A positions and orients each CMO by causing magnetic array 11 to generate a spatially and temporally varying magnetic field that interacts with magnetic moments of each CMO to generate net forces and torques. Magnetic array 11 encloses channel 13 containing solution 12 which includes polymer monomer 201. The position and orientation of workpiece 210 and composite magnetic scaffold elements is measured by sensor 17 in communication with control means 14 via cable 17A. Workpiece 210 is positioned and oriented relative to digital light projector 18B by forces and torques on the scaffold CMOs. As indicated at 216, workpiece may be translated in any direction and rotated about any axis by the scaffold CMOs. A facet 217 of workpiece 210 is exposed to a pattern of light from digital light projector 18B as shown at 214 and 215 and monomer is added to workpiece 210 by photo-polymerization at said locations. Workpiece 210 may be rotated to orient a plurality of other facets indicated at 218 and 219 to light from digital light projector 18B and material may be added via photo-polymerization to those facets. As shown fabricated object 220 has features indicated at 224 and 225 that correspond to features 214 and 215 of object 210. Object 220 has additional features 226 and 227 projected onto a different facet by digital light projector 18B. Some embodiments (not shown) include a plurality of digital light projectors project patterns of light into channel 13 from different directions. Object 220 may be a later stage of object 210 or may be a separate object fabricated independently. In the arrangement shown, a plurality of objects may be fabricated independently and in parallel. Unlike prior art, material may be added to a fabricated object from any direction by rotating and translating the workpiece.

Figure 7:
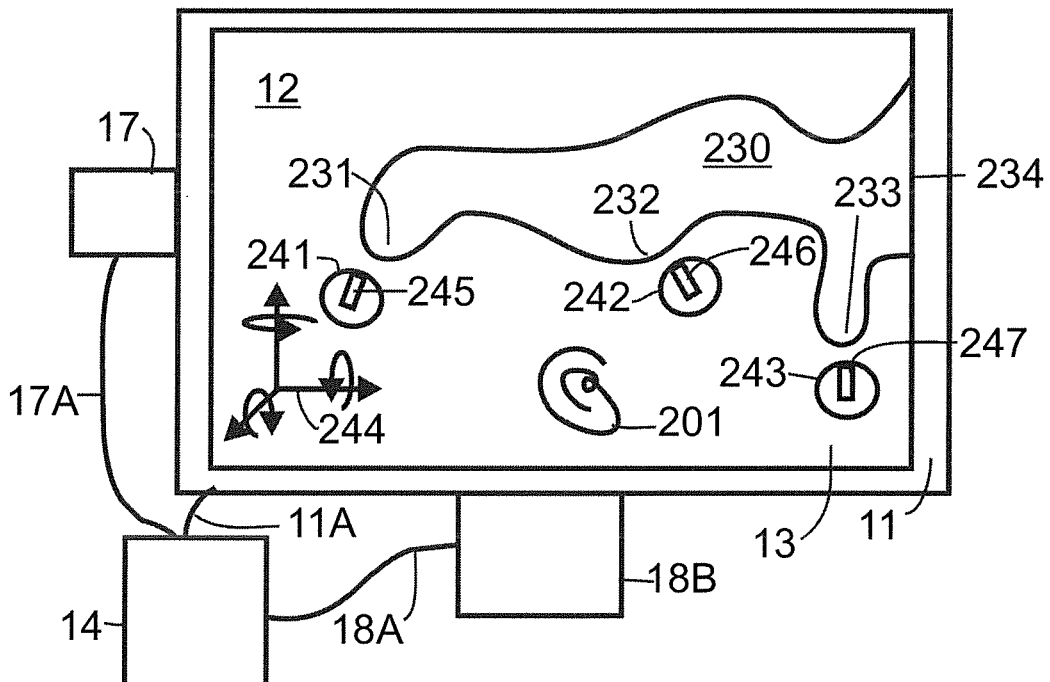
FIG. 7 shows an arrangement for adding material to an object at multiple locations.

FIG. 7 shows an alternative arrangement for fabricating a three dimensional object with the magnetic goniometer of the invention. Labels, where replicated, have the same meaning as corresponding labels in FIG. 6. Workpiece 230 is fabricated on base substrate 234 in chamber 13 containing solution 12 with monomer units 201. A plurality of CMOs indicated as 241, 242, and 243 are positioned and oriented by a spatially and temporally varying magnetic field generated by magnetic array 11 under the control of control means 14. Each CMO 241, 242, and 243 may be translated in any direction and rotated about any axis as indicated at 244. Each CMO 241, 242, and 243 may include all of the features shown in FIGS. 2 and 5. For brevity a radiation source is indicated at 245, 246 and 247 that may correspond to powered light source 64 on FIG. 2, non-linear light source 65 on FIG. 2, or a mirror (113, 123 or 133) on FIG. 5. CMO 241 is positioned and oriented at a working distance relative to location 231 where material is to be added and radiation source 245 directs radiation to location 231 causing material to be added by photo-polymerization.

As shown radiation source 245 receives radiation from light source 18 and either reflects and focuses the incident radiation as best shown at 133 on FIG. 5 or converts the radiation to a different wavelength as shown at 64 and 65 on FIG. 2. Radiation source 18 may for example emit radiation at 800 nm that is frequency doubled to 400 nm by radiation source 245. The 800 nm radiation in this example has insufficient energy to catalyze photo-polymerization whereas the 400 nm radiation emitted has sufficient energy to catalyze photo-polymerization at location 231. Radiation source 18 may for example be a LED that emits non-catalytic radiation at 630 nm. The 630 nm radiation is received and converted to electricity by a photodiode on CMO 241. The electricity generated powers radiation source 245 which in this example is a LED that emits at 405 nm catalyzing photo-polymerization. Radiation source 245 may select an emission wavelength from a plurality of emission wavelengths to catalyze a selected polymerization. For example, radiation source 245 may emit a first wavelength to catalyze photo-polymerization of a first monomer type and not catalyze photo-polymerization of a second monomer type. The polymerization reaction depletes the local concentration of the first monomer type for a time related by the diffusion constant of the solution. Radiation source may subsequently emit a second wavelength that catalyzes photo-polymerization of a second monomer type. While the second wavelength may have sufficient energy to catalyze photo-polymerization of the first monomer type, only the second type of monomer participates because the local concentration of the first monomer type was previously depleted. Using the method described above, a plurality of monomer types present in a solution may be added selectively at selected spatial locations.

As material is added the position of CMO 241 is adjusted to a working distance. The working distance may vary depending upon the pattern of deposition desired. For example the radiation source may include a focusing means such as a lens that produces a minimal spot size proximate to the lens focal length and larger spot sizes as distance from the focal length increases. The operator may decide to illuminate a minimal spot to produce a fine feature and a larger spot to produce a smooth feature.

As shown in FIG. 7 at 231, 232 and 233, material may be added concurrently at a plurality of locations anywhere on the three dimensional surface of workpiece 230 with magnetic goniometers 241, 242 and 243. Further, the number of active magnetic goniometer units may be increased in proportion to the available surface area of the workpiece greatly accelerating the rate of mass transfer to the workpiece. The capability to add material in three dimensions is a significant advance over prior art which is limited to mass deposition in an active two dimensional plane. Further, because the desired object can be fabricated in three dimensions, there is no need to add sacrificial support material as is the case for two dimensional fabrication processes.

Figure 8:
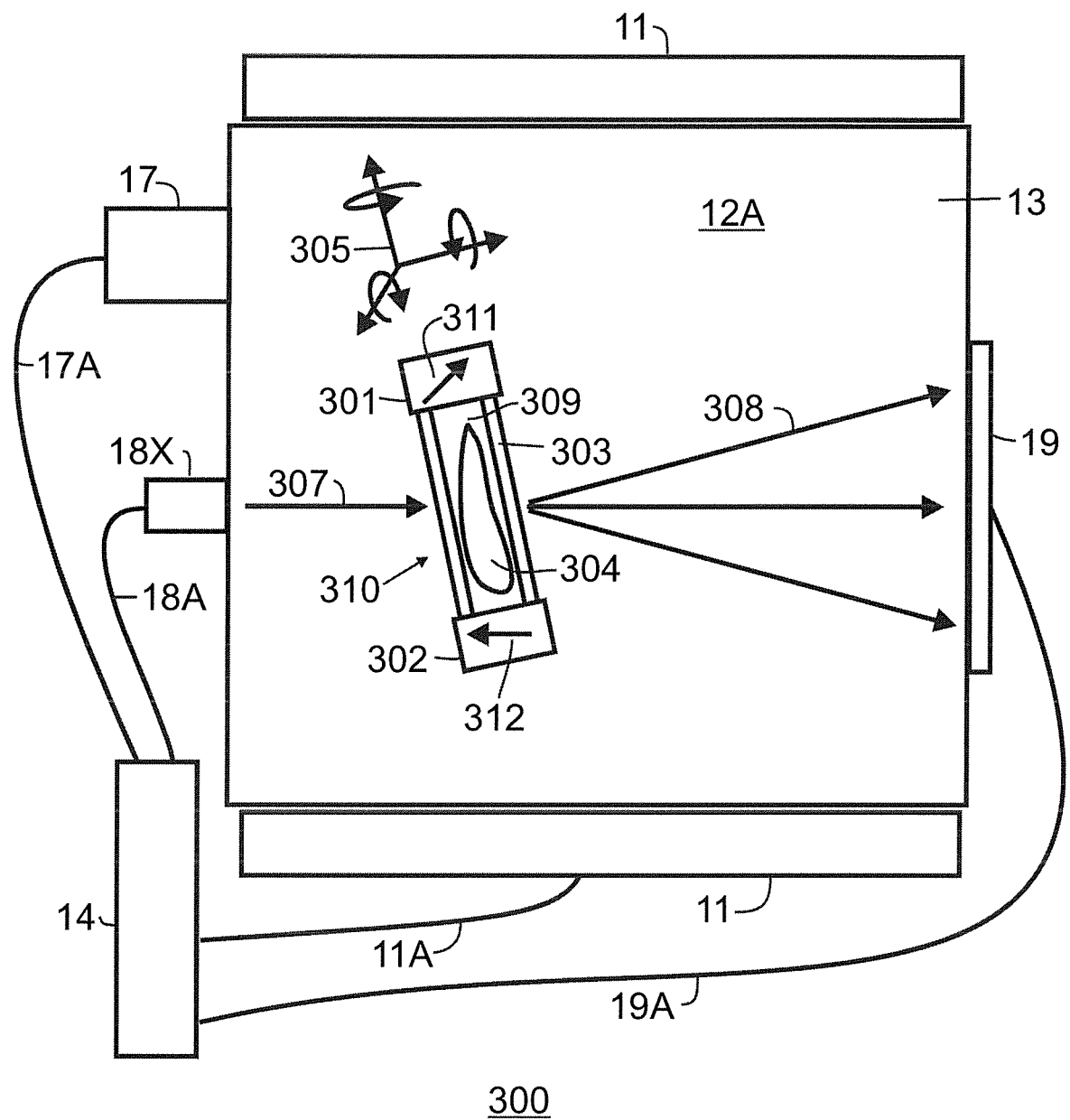
FIG. 8 is a schematic illustration of an embodiment of the invention used for measuring the diffraction pattern of a sample material held by a CMO.

FIG. 8 shows an arrangement generally indicated at 300 for measuring diffraction patterns with a CMO. The CMO 310 in chamber 13 consists of a hollow shell 303 with internal cavity 309. The hollow shell 303 is comprised of a material that is transmits almost all radiation 307 from radiation source 18X to a sample material 304 held within internal cavity 309. Hollow shell is preferably cylindrical, but may have any cross section suitable for transmitting radiation from radiation source 18X to sample material 304. The hollow shell 303 may for example be an x-ray capillary tube and the radiation source 18X may for example be an x-ray source. The radiation source 18X may for example be a neutron source and the hollow shell 303 may for example be comprised of beryllium. Chamber 13 may contain a fill gas 12A that is transparent to radiation 307. The pressure of the fill gas 12A may be one millionth of an atmosphere or less in some embodiments. The radiation source 18X may include a diffraction means to select wavelength and a collimation means to collimate radiation beam 307 incident on CMO 310. Radiation diffracted by the sample material 308 is measured by position sensitive detector array 19 which communicates with control means 14 by cable 19A. Hollow shell 303 is capped by end pieces 301 and 302, both comprised of a ferromagnetic material. The end pieces 301 and 302 have different magnetic moments as shown at 311 and 312, respectively. Magnetic moments 311 and 312 interact with the magnetic field generated by magnetic array 11 controlled by control means 14 by cable 11A. The interaction of the applied magnetic field generates forces and torques on CMO 310 causing CMO to rotate and translate with six degrees of freedom as indicated at 305. The position and orientation of CMO 310 is monitored by sensor 17 in communication with control means 14 via cable 17A. Control means 14 generates control signals to magnetic array 11 to generate a sequence of magnetic fields that interact with magnetic moments 311 and 312 to translate and rotate CMO through a sequence of desired measurement positions and orientations. For each desired position and orientation in the sequence, control means 14 uses information from sensor 17 to measure the position and orientation of CMO 310, compares to the measured position and orientation with the desired position and orientation, and iteratively generates control signals to magnetic array 11 causing magnetic fields to be produced that reduce the difference between the measured and desired position and orientation parameters to less than a threshold value. When CMO 310 is at a desired position and orientation, sensor array 19 measures the diffraction pattern for that position and orientation. In the case of a powder sample 304, CMO 310 may be reoriented to average diffraction from many crystal orientations in the powder. In the case of a single crystal sample 304, CMO 310 may be systematically aligned with different crystallographic planes relative to collimated incident radiation 307. In both cases the atomic structure of sample material 304 may be determined by analysis of the diffraction patterns by control means 14.

Figure 9A:
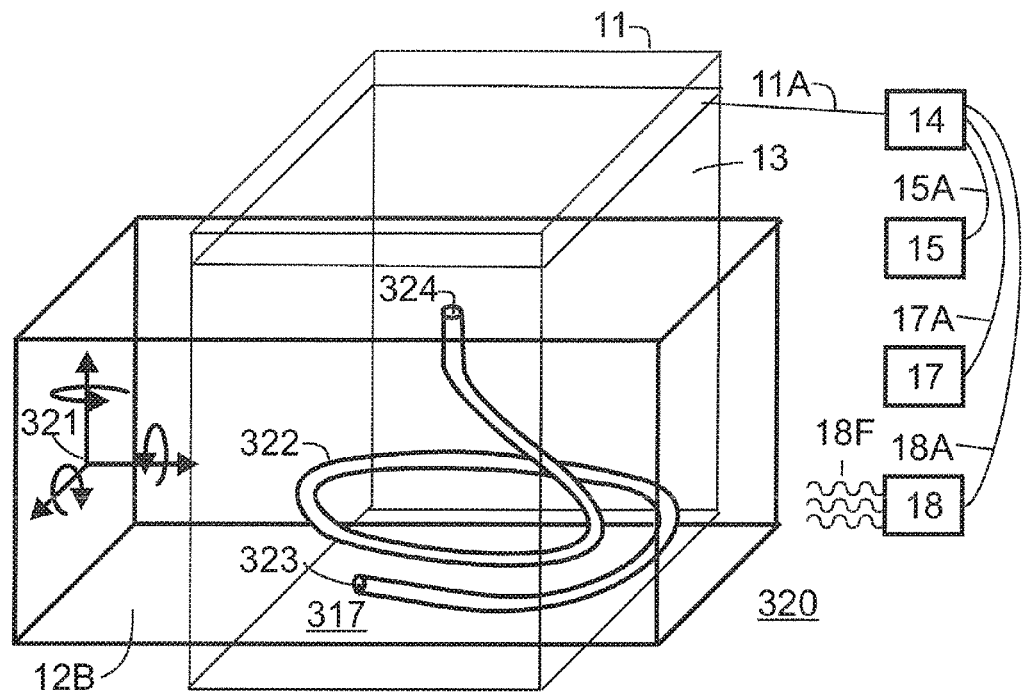
FIG. 9A is a schematic illustration of an embodiment of the invention used for machining a workpiece along an arbitrary path.

FIG. 9A schematically illustrates a magnetic object performing a machining operation in the interior of a workpiece generally indicated at 320. Control 14 communicates signals along cable 11A to magnetic array 11 causing magnetic array 11 to generate a sequence of temporally and spatially varying magnetic fields in channel 13. The magnetic field is measured by magnetic sensor 15 in communication with control means 14 via cable 15A. For simplicity magnetic array 11 is shown on one side of channel 13, but in general may surround channel 13. At least a portion of workpiece 12B is proximate to magnetic array 11. The array of electromagnets only needs to be capable of generating a magnetic field in the region 317 proximate to magnetic object 323. As indicated at 321, the workpiece 12B may be translated and oriented in any direction relative to the envelope of surrounding electromagnets 11. Translation has two main benefits. Firstly the workpiece may be translated in a manner that reduces the distance between an electromagnet and the region 317 proximate to the magnetic object thereby allowing larger field strength. Secondly, translation allows a smaller number of electromagnets to be used overall because the array of electromagnets only needs to be of sufficient size to influence the region 317.

Curvilinear path 322 is fabricated by the cutting action of magnetic object 323 that in this example functions as a cutting tool. The cutting tool 323 is first guided to a desired start location 324 on the surface of workpiece 12B and then is oriented and moved by a sequence of magnetic fields to remove material from workpiece creating curvilinear path 322. Because magnetic object 323 is not constrained by a shaft, it can cut in any direction and at any location where a suitable magnetic field can be generated. The path taken by the cutter 323 may for example be a spiral about the direction of the desired path. In this way the cutter 323 may function in a manner similar to a conventional mill or drill except that its range of motion is not constrained by a shaft. Alternately the path taken by the cutter may be reciprocal wherein the cutter is accelerated toward a first cut location where some material is removed, and then the cutter direction is reversed to allow distance for acceleration toward a second cut location. In addition to cutting, magnetic object 323 may be oriented and guided to push cuttings from region 317 along path 322 to path entrance 324.

As show schematically, radiation source 18 produces x-rays 18F, and the intensities of transmitted x-rays measured by detector 17 are analyzed by control device 14 to provide information about the path cut by magnetic object 323 in workpiece 12B.

It should be noted that there is no magnetic field that will provide an equilibrium position for the magnetic object as a consequence of the Earnshaw Theorem. It is however possible to oscillate the magnetic object 323 about a fixed point with small amplitude by rapidly adjusting the applied field to counter motion away from the fixed point. This method of dynamic balancing is used, for example in prior art magnetic bearings to balance forces about a single fixed point. In the present invention, the dynamic balancing is about points along an arbitrary curvilinear path specified by the user.

Figure 9B:
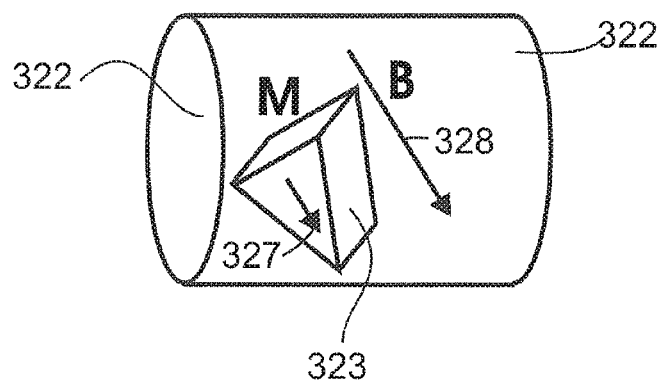
FIG. 9B is a schematic illustration of the cutting tool of FIG. 9A.

FIG. 9B shows a plane section through a segment of path region 322. This view, aside from scale is similar to FIG. 1. The cutter 323 is schematically wedge shaped in the diagram, but other shapes may be used. The cutter preferably has at least one permanent magnetic moment 327 that aligns with an external magnetic field 328 generated by the array of electromagnets 11.

In a preferred arrangement, the cutter has point group Cn symmetry in which a plurality (n) of permanent magnetic moments arranged about an axis of rotational symmetry. In this arrangement, the cutter is conceptually similar to the rotor of an electric motor and the array of electromagnets 11 is similar to the stator. However, in this arrangement the axis of rotation for the rotor is not fixed and the stator field is generated by elements that do not necessarily have the same symmetry axis as the rotor.

In another preferred arrangement, the magnetic cutter object 323 has point group T4 (tetragonal) symmetry and the cutter may rotate about any of the four symmetry axes. In this arrangement, the cutter can change direction of a cut merely by changing the magnetic field applied by the electromagnet array.

The invention claimed is:

1. A method for positioning and orienting a platform relative to a frame of reference, the method comprising:
providing the platform as a complex magnetic object that contains at least two magnetic domains where said at least two magnetic domains have permanent magnetic moments which are not collinear;
generating a spatially and temporally varying magnetic field which is applied to the complex magnetic object;
and causing the permanent non-collinear magnetic moments of said at least two magnetic domains to remain non-collinear in the magnetic field and thus to interact with the spatially and temporally varying magnetic field to produce torques on the complex magnetic object and which operate to orient the complex magnetic object by rotation in at least three whole body rotational degrees of freedom.

2. The method according to claim 1 wherein the complex magnetic object includes an integral tool that performs an operation on a workpiece.

3. The method according to claim 1 wherein the complex magnetic object is positioned and oriented relative to a location on a workpiece and an operation performed by the complex magnetic object causes material to be added to the workpiece.

4. The method according to claim 1 wherein the complex magnetic object is positioned and oriented relative to a location on a workpiece and an operation performed by the complex magnetic object causes material to be added to the workpiece and wherein the material is added by providing the complex magnetic object with a source of directional radiation and emitting the directional radiation to the additive location causing photo-polymerization of the additive material to the substrate at said additive location.

5. The method according to claim 1 wherein the complex magnetic object is positioned and oriented relative to a location on a workpiece and an operation performed by the complex magnetic object causes material to be added to the workpiece and wherein the material is added by providing the complex magnetic object with a catalyst storage device and releasing catalyst from the catalyst storage device to the additive location causing polymerization of the additive material to the substrate at said additive location.

6. The method according to claim 1 wherein the complex magnetic object is positioned and oriented relative to a location on a workpiece and an operation performed by the complex magnetic object causes material to be added to the workpiece and wherein a plurality of complex magnetic objects add material to a plurality of different substrate locations.

7. The method according to claim 1 wherein the complex magnetic object is positioned and oriented relative to a location on a workpiece and an operation performed by the complex magnetic object causes material at the location to be modified.

8. The method according to claim 1 wherein the position and orientation of the complex magnetic object is measured by a sensor and the information from the sensor is used at least in part to calculate a magnetic field pattern required to cause a change in the position or orientation of the complex magnetic object.

9. The method according to claim 4 wherein the complex magnetic object includes an energy transformation device that transforms energy from a first form to a second form.

10. The method according to claim 1 wherein the complex magnetic object is surrounded by a viscous material that produces a viscous drag force in opposition to said torques on the complex magnetic object on the complex magnetic object generated by said spatially and temporally varying magnetic field.

11. The method according to claim 1 wherein a three-dimensional object is fabricated on the complex magnetic object by the steps of providing an additive material proximate to the complex magnetic object, rotating and translating the complex magnetic object to bring the additive location position and orientation into correspondence with a required additive configuration and causing the additive material to be added and wherein a first set of material is added to the complex magnetic object in a first orientation and a second set of material is added to the complex magnetic object in a second orientation.

12. The method according to claim 1 wherein a three-dimensional object is fabricated on the complex magnetic object by the steps of providing an additive material proximate to the complex magnetic object, rotating and translating the complex magnetic object to bring the additive location position and orientation into correspondence with a required additive configuration and causing the additive material to be added and wherein the material is added by directing a beam of radiation toward an additive location on the complex magnetic object to cause photo-polymerization of the additive material to the complex magnetic object.

13. The method according to any claim 1 wherein a three-dimensional object is fabricated on the complex magnetic object by the steps of providing an additive material proximate to the complex magnetic object, rotating and translating the complex magnetic object to bring the additive location position and orientation into correspondence with a required additive configuration and causing the additive material to be added and wherein the three-dimensional object is formed on a plurality of complex magnetic objects.

14. A method for positioning and orienting a platform relative to a frame of reference to obtain information about a sample material, the method comprising:
providing the platform as a complex magnetic object that contains at least two magnetic domains with non-collinear magnetic moments;
attaching a sample material to a sample location on a surface of the complex magnetic object;
directing a beam of radiation toward the sample location;
for a plurality of measurement configurations, rotating and translating the complex magnetic object to bring the sample location position and orientation into correspondence with each measurement configuration and measuring radiation transmitted, reflected or scattered from said sample material;

analyzing said plurality of measurements with a computation device to obtain said information about the sample material;

and wherein the complex magnetic object is rotated and translated to each measurement configuration by generating a sequence of magnetic fields that interact with said at least two magnetic domains of the complex magnetic object to produce forces and torques on the complex magnetic object.

15. The method according to claim 14 wherein the sample material is placed on the complex magnetic object with at least one sample material axis statistically related to the direction of an axis of the complex magnetic object axis.

16. The method according to claim 15 wherein the axis is a crystallographic axis of the complex magnetic object.

17. The method according to claim 14 wherein the orientation of the sample material is related to the radiation beam direction and polarization by a set of Euler angles.

18. The method according to claim 14 wherein the complex magnetic object further includes surface features that enhance the electromagnetic fields in an enhancement region proximate to the surface features and at least a portion of the sample material is placed in the enhancement region.

19. The method according to claim 14 wherein the sample material is positioned and oriented relative to a plurality of enhancement regions wherein each enhancement region changes a different spectral property of the sample material.

20. The method according to claim 14 wherein complex magnetic object is formed from a plurality of separate substrates where the sample material is attached to selected ones of said plurality of substrates with different properties wherein each selected one of said plurality of substrates is located on a different face of the complex magnetic object.

21. The method according to claim 14 wherein the sample material is attached to the complex magnetic object by an antibody.

22. The method according to claim 14 wherein the complex magnetic object includes a label material that is added to the sample material.

23. The method according to claim 14 wherein the sample material is a cell, tissue, antigen, biological macromolecule or a biological reagent.

24. The method according to claim 14 wherein an optical element is attached at a location on a surface of the complex magnetic object.

25. The method according to claim 24 wherein the optical element comprises one of of an absorbing element, a filter, an aperture, a mirror, a lens, a prism, and a grating.

26. The method according to claim 24 wherein the optical element is positioned relative to a sample material to make a measurement.

27. A method for positioning and orienting a platform relative to a frame of reference, the method comprising:

providing the platform as a complex magnetic object that contains at least two magnetic domains where said at least two magnetic domains have permanent magnetic moments which are not collinear;

generating a spatially and temporally varying magnetic field which is applied to the complex magnetic object;

and causing the permanent non-collinear magnetic moments of said at least two magnetic domains to remain non-collinear in the magnetic field and thus to interact with the spatially and temporally varying magnetic field to produce forces and torques on the complex magnetic object wherein the forces operate to translate the complex magnetic object by at least three whole body translational degrees of freedom and the torques operate to orient the complex magnetic object by at least three rotational degrees of freedom.

28. The method according to claim 27 wherein the complex magnetic object includes an integral tool that performs an operation on a workpiece.

29. The method according to claim 27 wherein the complex magnetic object is positioned and oriented relative to a location on a workpiece and an operation performed by the complex magnetic object causes material to be added to the workpiece.

30. The method according to claim 27 wherein the complex magnetic object is positioned and oriented relative to a location on a workpiece and an operation performed by the complex magnetic object causes material to be added to the workpiece and wherein the material is added by providing the complex magnetic object with a source of directional radiation and emitting the directional radiation to the additive location causing photo-polymerization of the additive material to the substrate at said additive location.

31. The method according to claim 27 wherein the complex magnetic object is positioned and oriented relative to a location on a workpiece and an operation performed by the complex magnetic object causes material to be added to the workpiece and wherein the material is added by providing the complex magnetic object with a catalyst storage device and releasing catalyst from the catalyst storage device to the additive location causing polymerization of the additive material to the substrate at said additive location.

32. The method according to claim 27 wherein the complex magnetic object is positioned and oriented relative to a location on a workpiece and an operation performed by the complex magnetic object causes material to be added to the workpiece and wherein a plurality of complex magnetic objects add material to a plurality of different substrate locations.

33. The method according to claim 27 wherein the complex magnetic object is positioned and oriented relative to a location on a workpiece and an operation performed by the complex magnetic object causes material at the location to be modified.

34. The method according to claim 27 wherein the position and orientation of the complex magnetic object is measured by a sensor and the information from the sensor is used at least in part to calculate a magnetic field pattern required to cause a change in the position or orientation of the complex magnetic object.

35. The method according to claim 27 wherein the complex magnetic object includes an energy transformation device that transforms energy from a first form to a second form.

36. The method according to claim 27 wherein the complex magnetic object is surrounded by a viscous material that produces a viscous drag force in opposition to said torques on the complex magnetic object on the complex magnetic object generated by said spatially and temporally varying magnetic field.

37. The method according to claim 27 wherein a three-dimensional object is fabricated on the complex magnetic object by the steps of providing an additive material proximate to the complex magnetic object, rotating and translating the complex magnetic object to bring the additive location position and orientation into correspondence with a required additive configuration and causing the additive material to be added and wherein a first set of material is added to the complex magnetic object in a first orientation and a second set of material is added to the complex magnetic object in a second orientation.

38. The method according to claim 27 wherein a three-dimensional object is fabricated on the complex magnetic object by the steps of providing an additive material proximate to the complex magnetic object, rotating and translating the complex magnetic object to bring the additive location position and orientation into correspondence with a required additive configuration and causing the additive material to be added and wherein the material is added by directing a beam of radiation toward an additive location on the complex magnetic object to cause photo-polymerization of the additive material to the complex magnetic object.

39. The method according to any claim 27 wherein a three-dimensional object is fabricated on the complex magnetic object by the steps of providing an additive material proximate to the complex magnetic object, rotating and translating the complex magnetic object to bring the additive location position and orientation into correspondence with a required additive configuration and causing the additive material to be added and wherein the three-dimensional object is formed on a plurality of complex magnetic objects.

* * * * *